United States Patent [19]

Terrado Albareda

[11] 4,172,401
[45] Oct. 30, 1979

[54] SHEARING DEVICE

[75] Inventor: Angel R. Terrado Albareda, Mersch, Luxembourg

[73] Assignee: The Goodyear Tire & Rubber Company, Akron, Ohio

[21] Appl. No.: 904,829

[22] Filed: May 11, 1978

[51] Int. Cl.² .................. B23D 15/14; B26D 5/12; B26D 5/18

[52] U.S. Cl. .................................... 83/630; 83/639; 83/699; 83/698; 83/635; 83/524

[58] Field of Search ............... 83/630, 632, 635, 636, 83/639, 698, 699, 626, 524, 604

[56] References Cited

U.S. PATENT DOCUMENTS

| | | | |
|---|---|---|---|
| 3,150,551 | 9/1964 | Spengler et al. | 83/699 X |
| 3,195,387 | 7/1965 | Telfer | 83/639 |
| 3,486,407 | 12/1969 | Barnes | 83/630 |
| 3,524,374 | 8/1970 | Diolot | 83/639 |
| 3,678,792 | 7/1972 | Dvorak | 83/639 |
| 3,682,029 | 8/1972 | Hass et al. | 83/630 |
| 3,691,890 | 9/1972 | Kuchyt | 83/639 |
| 3,866,503 | 2/1975 | Gal | 83/630 |
| 3,913,438 | 10/1975 | Walters et al. | 83/639 |

Primary Examiner—Donald R. Schran
Attorney, Agent, or Firm—R. S. Washburn

[57] ABSTRACT

A device for cutting strip material across its length has a single plate frame in which a tool slide is reciprocable by a toggle linkage driven by moving cylinders the piston rods of which are fixed to the frame. Fluid delivered by way of passages in the piston rods powers the movement of the cylinders for smooth vibration free action. The foregoing abstract is not to be taken as limiting the invention of this application, and in order to understand the full nature and extent of the technical disclosure of this application, reference must be made to the accompanying drawing and the following detailed description.

5 Claims, 3 Drawing Figures

SHEARING DEVICE

The present invention relates to a shearing device useful for cutting transversely a strip of wire cord or cable-reinforced tire building stock.

The principal object of the invention is a compact shearing device operable with minimum vibration.

The foregoing object and others which will become apparent from the ensuing description are accomplished in accordance with the invention by a shearing device having a shearing tool slidable in a frame holding an opposed fixed shear tool, said frame comprising a single plate having parallel plane faces, opposing side portions, and a bottom portion, an opposed parallel pair of plate members secured contiguously respectively on said plane faces parallel to and spaced away from said bottom portion, a parallel pair of guides fixed respectively on said side portions in coplanar and opposing relation, tool slide means carrying said shear tool and comprising a slide plate coplanar with said single plate and having a pair of slides respectively slidably engaging said pair of guides, clamp means for fixing said shear tool on said slide plate comprising a pair of pillow blocks spaced apart and secured to said side plate, a pivot shaft supported in and extending between said pillow blocks parallel to said plane faces and transversely of the direction of movement of the slide plate in the frame, a tool clamp mounted on and angularly movable about said tool pivot shaft, said clamp having a first portion the sides of which respectively abut said pillow blocks and a second portion including a shear tool clamping recess and an inclined ledge inclined at a shearing angle with respect to the direction of movement of said tool slide plate in said frame, and spring means engaging said tool clamp first portion for biasing said tool clamp second portion toward said slide plate and means for securing said opposed fixed shearing tool in the bottom portion of said single plate, and driving means for actuating said tool slide means.

In a further aspect, the objects are accomplished by a shearing device having driving means for actuating a tool slide in a frame comprising a toggle pin, a trunnion fixed respectively on each end of said toggle pin, an upper link pivotally connected to said frame and to said toggle pin, a pair of lower links pivotally connected to said tool slide and to said toggle pin, a pair of parallel piston rods extending transversely of the direction of movement of said tool slide, each rod having a piston fixed thereon, a plurality of brackets each fixed on said frame, each rod fixed in and extending between a respectively associated pair of said brackets, a fluid power cylinder slidable coaxially along each rod relative to the piston thereon, each piston sealingly dividing the associated cylinder to form a first and a second variable volume chamber, each cylinder having a saddle fixed thereon intermediate of the ends thereof, each said saddle having a slot extending normal to the plane defined by said piston rods, said slots slidably confining said trunnions for movement perpendicular to said plane, each piston rod having fluid passages therein respectively connecting each of its ends with the respectively associated variable volume chamber to provide the sole fluid flow communication therewith, whereby fluid pressure applied in each of said first chambers can drive said cylinders along said rods and cause said saddles to move said trunnions and said toggle pin to actuate said tool slide.

To acquaint persons skilled in the arts most closely related to the present invention, certain preferred embodiments thereof illustrating a best mode now contemplated for putting the invention into practice are described herein by and with reference to the annexed drawings forming a part of the specification. The embodiments shown and described herein are illustrative and as will become apparent to those skilled in these acts can be modified in numerous ways within the spirit and scope of the invention defined in the claims hereof.

Figure 1:
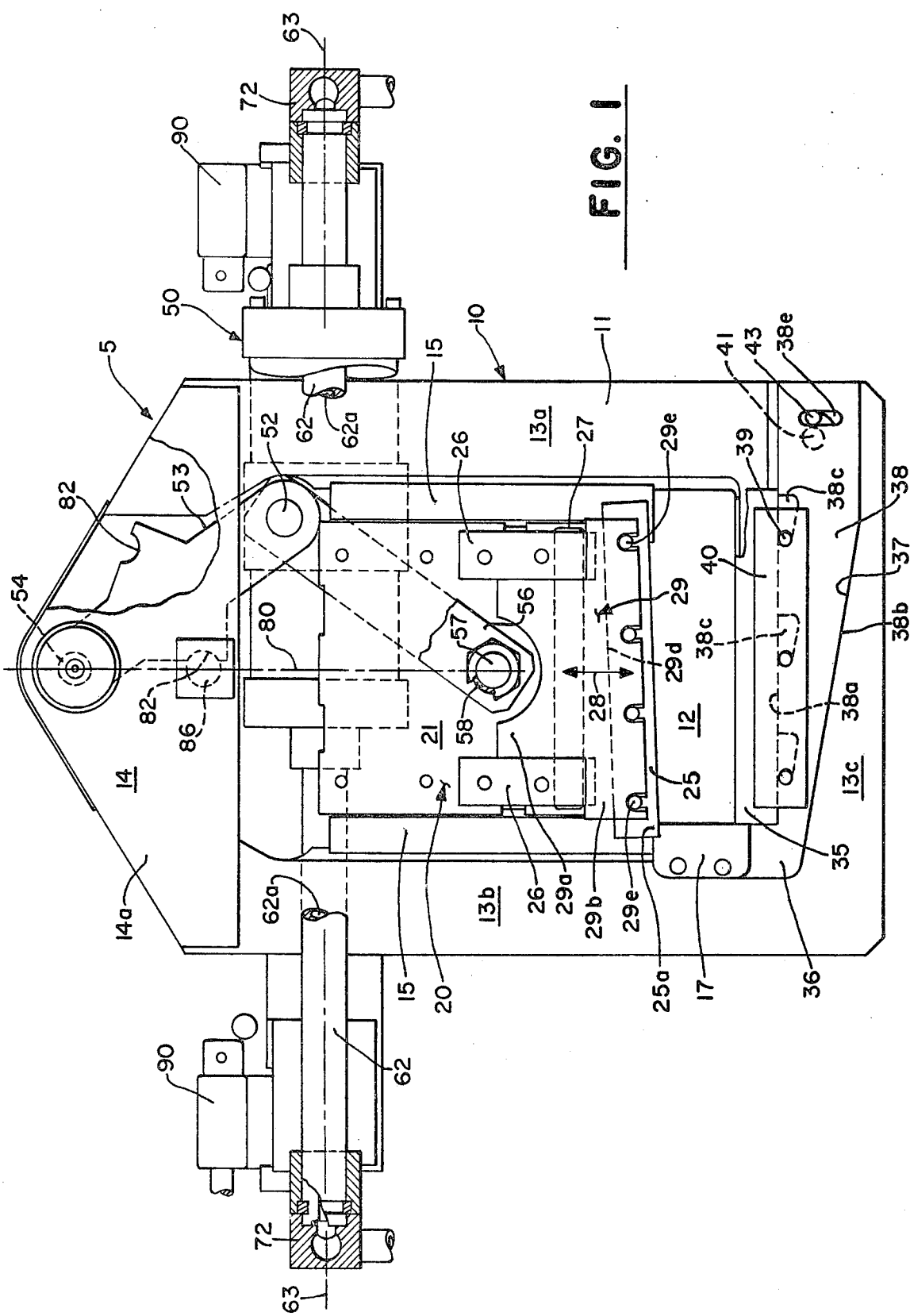
FIG. 1 is a view in front elevation of the device according to the invention.

Making reference to the drawings, the device 5 comprises a rigid frame 10, a tool slide 20, and fluid power operated driving means 50.

The frame 10 is formed of a single plate 11 having parallel opposed faces 11a, 11b and a rectangular opening 12 defined by the respective side portions 13a, 13b, and bottom portions 13c of the plate. The top portion 14 of the frame is provided by a pair of plate members 14a, 14b fixed respectively on the faces 11a, 11b of the frame parallel to and spaced upwardly from the bottom portion. A parallel pair of guides 15 are fixed respectively on the frame side portions in coplanar and opposing relation. Conveniently, the guides are formed with V-sections having their apices directed inwardly to the opening 12. To carry a shear tool, a tool slide 20 includes a plate 21 which is coplanar with the frame plate 11 and mounted in the opening 12 by beveled edges 22 which respectively slidably engage the guides 15 fixed on the frame. The V-sections, conjugate with the guides 15, are formed by a pair of beveled strips 23 fixed in respective recesses in the slide plate.

To fix the shear tool 25 on the slide plate 21, a pair of pillow blocks 26 are secured on the near face (FIG. 1) of the plate 21. A pivot shaft 27 is supported in and extends between the pillow blocks parallel to the plane faces of the frame and transversely of the direction of movement 28 of the slide plate. The tool clamp 29 has a portion 29a the sides of which, FIG. 1, abut respectively the sides of the pillow blocks. The clamp is bored to receive the pivot shaft therethrough, providing limited rotational movement of the clamp about the shaft. The intermediate part of the upper portion 29a of the clamp is cut away to provide clearance for a part of the driving means subsequently to be described. The lower portion 29b of the clamp, FIG. 3, has a tool clamping recess for receiving the shear tool 25 on a planar seat 29c parallel to the slide plate and against an inclined ledge 29d which is inclined at a suitable shearing angle. In the present embodiment, this angle is about two degrees, which is about 88 degrees with respect to the direction 28 of movement of the tool slide. In the present embodiment, the lower portion of the clamp is provided with slots to accommodate cap screws 29e which are screwed into tapped holes provided in the shear tool.

To bias the clamp 29 and the shear tool 25 toward the slide plate 21 and particularly for effective shearing contact with the fixed shear tool 35, compression springs 31 are disposed in openings 32 in the slide plate to bear against the upper portion 29a of the clamp. A plug 33 screwed into each opening is adjustably fixed to support the compression spring.

The leading end 25a of the shear tool, at the left in FIG. 1, bears also on a blade guide plate 17 fixed on the frame.

For mounting the fixed shear tool 35 in the bottom portion 13c of the single plate, a recess is sunk in the bottom portion to provide a mounting face 36, which is parallel to the plane faces of the plate 11, and a ramp 37 which is inclined with respect to the direction 28 of movement of the tool slide plate at an oblique angle, which angle in the present embodiment is about 80 degrees. A tool support plate 38 disposed in the recess has a first edge plane 38a which is perpendicular to the direction 28 of movement of the tool slide 20 and supports the fixed shearing tool 35. The second edge plane 38b of the support plate is formed at the oblique angle of the ramp 37 and is slidably engaged with the ramp to permit adjustment of the fixed shearing tool in the direction 28 of movement of the slide plate. The support plate also has a plurality of slots 38c open upwardly in the first edge plane to accommodate capscrews 39 which secure a clamp member 40 to the bottom portion 13c of the frame. To allow adjustment of the support plate relative to the screws, the bottoms of the slots are inclined parallel to the oblique angle of the second edge plane 38b of the support member. The lower shearing tool 35 is supported on the support member 38 and clamped by the cap-screws 39 between the clamp member 40 and the bottom portion 13c of the frame. By releasing the clamp member at least partially, the support member can be moved along the inclined ramp to raise or to lower the shear tool relative to the upper shear tool 25 carried on the tool slide.

To adjust the support member 38 relative to the frame, the member is provided with a slot 38e which extends parallel to the direction of movement 28 of the tool slide and an adjusting shaft 41 is rotatably mounted in a bore 42 through the plate 11. The shaft has a stud 43 positioned thereon eccentrically with respect to the rotation axis of the adjustment shaft 41 which stud protrudes into the slot 38e in the support member. The adjustment shaft can be rotated by the knob 44 to move the stud and thereby move the support member 38, when the latter is released, to a desired position relative to the upper shear tool 25 after which the clamp member 40 is again clamped by the cap-screws so as to hold both the fixed tool 35 and the support member 38 in firm engagement with the frame 10.

For actuating the tool slide thereby to move the upper shear tool for shearing engagement with the lower shear tool, the device includes driving means 50 comprising a toggle linkage and notably a fluid power mechanism which acts on the toggle pin 52.

The toggle linkage includes an upper link 53 which is pivotally mounted by a pin 54 which is rotatably fixed in bearings 55 mounted on the top plate members 14 so that the upper link swings in a plane parallel to and between the faces 11a, 11b of the frame. The upper link 53 at its other end is pivotably about the toggle pin 52. A pair of lower links 56 are pivotally connected to the tool slide 20 to swing around a pin 57 carried in a bearing 58 fixed in the tool slide, the pin 57 extending perpendicularly with respect to the plane of the frame. The respective lower links are disposed, one on each side, parallel and close to the upper link 53 at the toggle pin. The toggle pin extends equally and oppositely outward of the two lower links to accommodate, on each of its ends, a trunnion block 60, the respective sides of which lie in parallel vertical planes.

Figure 2:
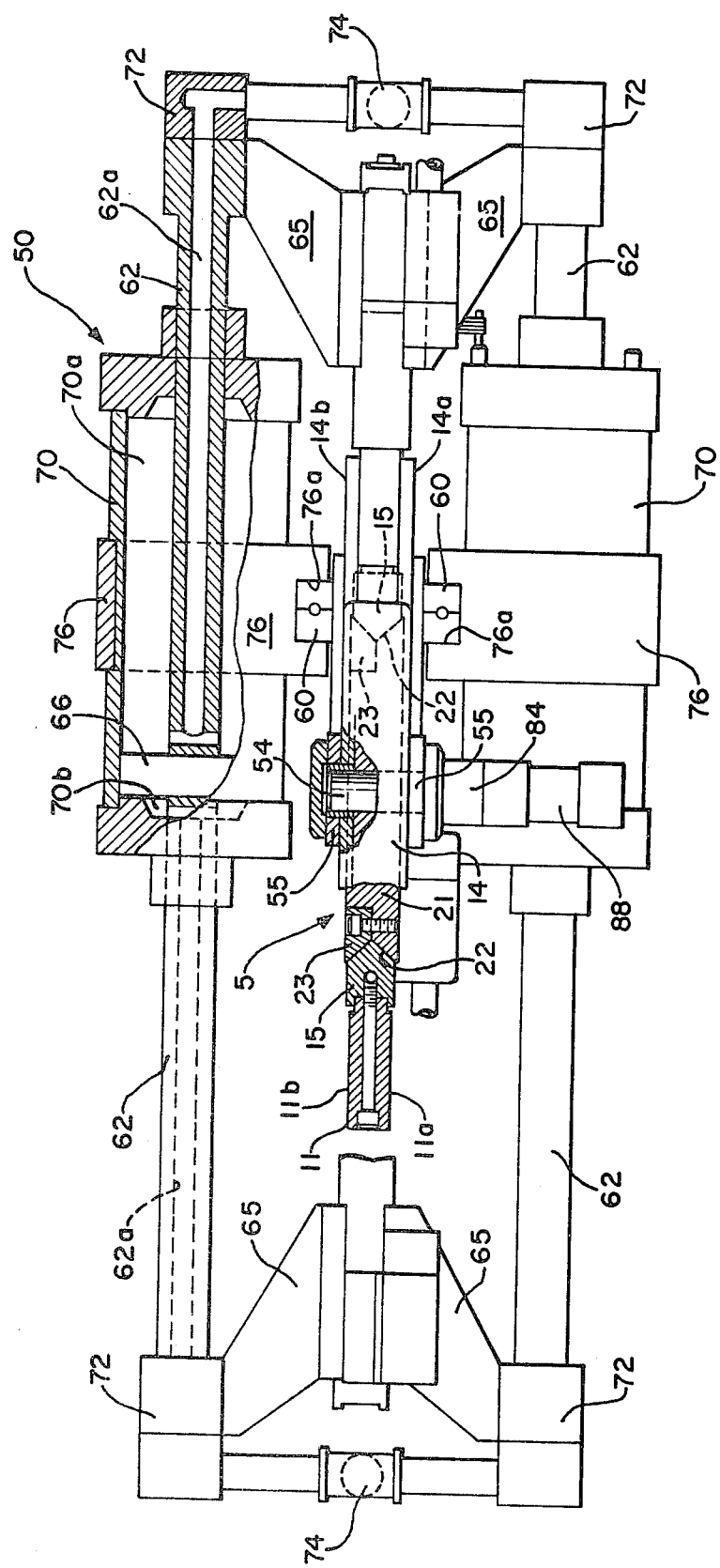
FIG. 2 is a plan view of the device of FIG. 1.

The fluid power mechanism, FIG. 2, includes a parallel pair of piston rods 62 which extend transversely of the direction 28 of movement of the tool slide, the piston rods being fixed in a plane 63 which is perpendicular to the direction 28 of movement of the tool slide. Each piston rod is fixed in and extends between an associated pair of brackets 65 fixed on the frame, the brackets associated with the respective piston rods extending outwardly oppositely from the single plate 11 of the frame.

Each piston rod has fixed coaxially thereon a piston 66 preferably located centrally between the respective ends of the rod. A fluid power cylinder 70 having cylinder heads each sealingly slidable coaxially along the rod and relatively of the associated piston, is divided by the piston in two variable volume chambers 70a, 70b. Each piston rod has a fluid passage 62a therein which connects the respectively associated chamber and rod end and provides the sole communication for fluid flow between each respective chamber and a source of controlled fluid pressure (not shown). An elbow fitting 72 suitably secured to each bracket is connected by rigid piping 74 fixed to the frame to the fluid pressure source so that fluid at controlled pressure can flow to or from the respectively associated chambers 70a, 70b. The arrangement described provides the advantage of completely eliminating flexible tubing, piping, joints, and the like, which if connected otherwise to the fluid power cylinders would necessarily move in correspondence with movement of the cylinders. In the present arrangement as has been mentioned, the fluid flow is entirely by way of rigid fixed flow passages thereby significantly reducing the risk of damage to the fluid connections during operation of the device.

Each of the two cylinders 70 has fixed securely thereon, intermediate its axial length, a saddle 76 in which is formed a slot 76a extending normal to the plane 63 defined by the piston rods and the sides of which slots are plane surfaces which slidably engage the plane surfaces of the trunnion block 60.

The tool slide 20 is actuated, the toggle linkage being disposed as seen in FIG. 1, by the introduction of fluid under pressure in the left chambers 70b as viewed in FIG. 2, greater than the pressure in the right chambers 70a thereby causing the cylinders 70 to move toward the left. The trunnion blocks 60, being slidably retained in the slots, are moved to the left as seen in FIGS. 1 and 2 thereby moving the toggle pin 52 to swing both the upper 53 and the lower links 56 about their respective pivot mountings to cause the tool slide to move downwardly as seen in FIG. 1. As the arcuate movement of the toggle pin to the left continues beyond the line 80 of the respective pivot mountings, the tool slide is reversed and raised to the position shown in FIG. 1 in readiness for the next shearing cycle.

Figure 3:
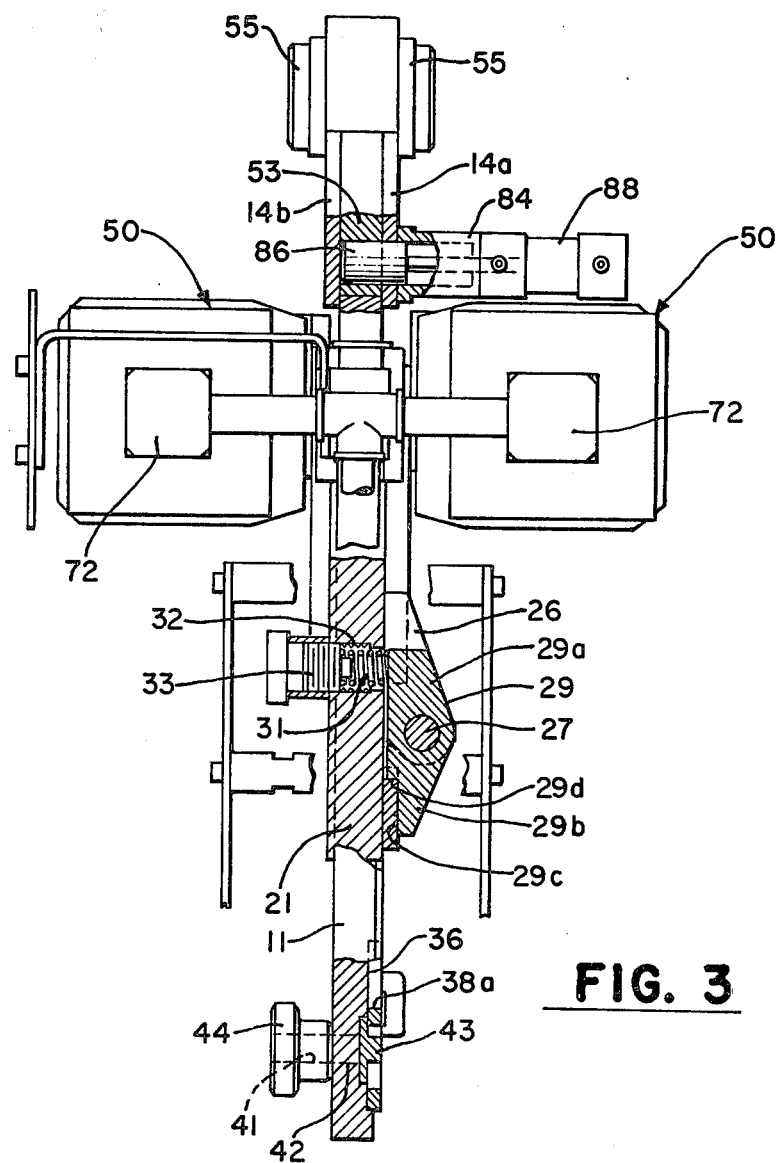
FIG. 3 is a view in side elevation of the device of FIG. 1.

For preventing a next actuation of the tool slide 20, a single stroke means is provided in the shearing device 5 by the combination of a pair of stops 82 which are formed integrally of and extend laterally and symmetrically outwardly of and coplanar with the upper link 53 and a slide sleeve 84 which is fixed, symmetrically of the line 80, in the frame top plate member 14a. The sleeve accommodates a plunger 86 for sliding movement perpendicular to the face 11a of the frame. A servo means such as the fluid power cylinder 88 is mounted outwardly on the bushing and connected to actuate the plunger 86 reciprocably between a locked position as seen in FIG. 3 and an unlocked position wherein the plunger 86 disengages one or the other of the stops 82. This device prevents pivotal movement of the upper link 52 from its position as seen in FIG. 1 or alternatively from its position located equally and oppositely with respect to the line 80 of centers of the pivot pins 54, 57.

Control of the fluid power delivered to the cylinders is by conventional means well known to those skilled in the art and need not be described herein. Actuation of the conventional controls can be effected by limit switches 90, such as those illustrated in FIG. 1, positioned to detect predetermined limits of the travel of the cylinders 70 and to create signals for controlling flow to one or the other of the variable volume chambers, as well as control of the fluid power cylinder 88 for moving the plunger between its unlocked and its locking positions.

The absence of flexible tubing, swivel joints, or their equivalents, for conducting fluid to the power cylinders is a particularly advantageous feature of the invention inasmuch as it avoids, or minimizes, damage to the fluid power connections and the consequent risk of leakage of fluids therefrom. A further feature of advantage is that the piston rods are fixed in position and are never subjected to axial compressive loads. The rods are, therefore, much less subject to the risk of buckling in the event of an accidental overload. The apparatus is compact, has a big cutting force, and is operable relatively free of fibration. A further feature is the high cutting speed, due to the toggle linkage being reversible and operable from both sides. Dead time at the end of cutting action is minimized by eliminating the need to reverse the action of the power cylinders and using the kinetic energy of the system to assist in retracting the cutting head.

While certain representative embodiments and details have been shown for the purpose of illustrating the invention, it will be apparent to those skilled in the art that various changes and modifications may be made therein without departing from the spirit or scope of the invention.

What is claimed is:

1. A shearing device having driving means for actuating a tool slide in a frame comprising a toggle pin, a trunnion fixed respectively on each end of said toggle pin, an upper link pivotally connected to said frame and to said toggle pin, a pair of lower links pivotally connected to said tool slide and to said toggle pin, a pair of parallel piston rods extending transversely of the direction of movement of said tool slide, each rod having a piston fixed thereon, a plurality of brackets each fixed on said frame, each rod fixed in and extending between a respectively associated pair of said brackets, a fluid power cylinder slidable coaxially along each rod relative to the piston thereon, each piston sealingly dividing the associated cylinder to form a first and a second variable volume chamber, each cylinder having a saddle fixed thereon intermediate of the ends thereof, each said saddle having a slot extending normal to the plane defined by said piston rods, said slots slidably confining said trunnions for movement perpendicular to said plane, each piston rod having fluid passages therein respectively connecting each of its ends with the respectively associated variable volume chamber to provide the sole fluid flow communication therewith, whereby fluid pressure applied in each of said first chambers can drive said cylinders along said rods and cause said saddles to move said trunnions and said toggle pin to actuate said tool slide.

2. A shearing device having driving means for actuating a tool slide as claimed in claim 1, further comprising single stroke means for preventing a next actuation of said tool slide and comprising a pair of stops fixed on and extending laterally and symmetrically oppositely of and coplanar with said upper link, a slide bushing disposed in said frame perpendicular to the plane defined by pivoting movement of said upper link, a plunger slidably reciprocable in said bushing between an unlocked position, and a locking position wherein said plunger engages one or the other of said stops so as to prevent pivotal movement of said upper link, and servo means for moving said plunger between said unlocked and said locking position.

3. A shearing device having a shearing tool slidable in a frame holding an opposed fixed shear tool, said frame comprising a single plate having parallel plane faces, opposing side portions, and a bottom portion, an opposed parallel pair of plate members secured contiguously respectively on said plane faces parallel to and spaced away from said bottom portion, a parallel pair of guides fixed respectively on said side portions in coplanar and opposing relation, tool slide means carrying said shear tool and comprising a slide plate coplanar with said single plate and having a pair of slides respectively slidably engaging said pair of guides, clamp means for fixing said shear tool on said slide plate comprising a pair of pillow blocks spaced apart and secured to said side plate, a pivot shaft supported in and extending between said pillow blocks parallel to said plane faces and transversely of the direction of movement of the slide plate in the frame, a tool clamp mounted on and angularly movable about said pivot shaft, said clamp having a first portion the sides of which respectively abut said pillow blocks and a second portion including a shear tool clamping recess and an inclined ledge inclined at a shearing angle with respect to the direction of movement of said tool slide plate in said frame, and spring means engaging said tool clamp first portion for biasing said tool clamp second portion toward said slide plate and means for securing said opposed fixed shearing tool in the bottom portion of said single plate, and driving means for actuating said tool slide means.

4. A shearing device having a shear tool slidable in a frame holding an oposed fixed shearing tool, said frame comprising a single plate having parallel plane faces, opposing side portions, and a bottom portion, an opposed parallel pair of plate members secured contiguously respectively on said plane faces parallel to and spaced away from said bottom portion, a parallel pair of guides fixed respectively on said side portions in coplanar and opposing relation, tool slide means carrying said shear tool and comprising a slide plate coplanar with said single plate and having a pair of slides respectively slidably engaging said pair of guides, fixed shear tool mounting means for positioning a fixed shear tool in said frame comprising a recess formed in said single plate bottom portion and having a mounting face parallel to said plane faces and a ramp inclined with respect to the direction of movement of said tool slide plate at an oblique angle, a tool support plate disposed in said recess and having a first edge plane perpendicular to the direction of movement of said tool slide plate for supporting engagement with said shear tool, a second edge plane formed at said oblique angle slidably engaging said ramp, a clamping member releasably affixed to said frame bottom portion and extending transversely of said direction of movement, overlying said support member and said shear tool for clamping both said tool and said support member to said frame bottom portion, and driving means for actuating said tool slide means.

5. A device as claimed in claim 4, said support member having a slot extending parallel said direction of movement, an adjustment shaft rotatably mounted in said frame and having a stud fixed eccentrically thereon to enter said slot, a knob fixed on said adjustment shaft for effecting rotation thereof to move said stud and thereby said support member, when the same is released, along said ramp.

* * * * *